US010091272B2

(12) United States Patent
Cho et al.

(10) Patent No.: US 10,091,272 B2
(45) Date of Patent: Oct. 2, 2018

(54) METHOD AND APPARATUS FOR REMOTELY CONTROLLING HOME DEVICE IN HOME NETWORK SYSTEM

(71) Applicant: Samsung Electronics Co., Ltd., Suwon-si, Gyeonggi-do (KR)

(72) Inventors: Chi-Hong Cho, Suwon-si (KR); Dong-Keon Kong, Suwon-si (KR); Sang-Ho Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 555 days.

(21) Appl. No.: 14/477,261

(22) Filed: Sep. 4, 2014

(65) Prior Publication Data

US 2015/0067080 A1  Mar. 5, 2015

(30) Foreign Application Priority Data

Sep. 5, 2013  (KR) .................. 10-2013-0106547

(51) Int. Cl.
*G06F 15/16* (2006.01)
*H04L 29/08* (2006.01)
*H04W 4/12* (2009.01)

(52) U.S. Cl.
CPC .......... *H04L 67/025* (2013.01); *H04W 4/12* (2013.01)

(58) Field of Classification Search
CPC ............................. H04L 67/025; H04W 4/12
USPC ......................................................... 709/206
See application file for complete search history.

(56) References Cited

U.S. PATENT DOCUMENTS

| 7,310,344 B1 | 12/2007 | Sue | |
| 2003/0233424 A1* | 12/2003 | Seo | G08C 17/02 709/217 |
| 2006/0142880 A1* | 6/2006 | Deen | G05B 15/02 700/19 |
| 2009/0215477 A1* | 8/2009 | Lee | H04L 51/38 455/466 |
| 2012/0034938 A1* | 2/2012 | Kreitzer | H04L 12/581 455/466 |
| 2012/0054646 A1* | 3/2012 | Hoomani | A63F 13/79 715/758 |
| 2013/0006400 A1* | 1/2013 | Caceres | H04L 12/2803 700/90 |
| 2014/0114499 A1* | 4/2014 | Perner | H04W 4/12 701/2 |

FOREIGN PATENT DOCUMENTS

CN  101212628  *  7/2008

* cited by examiner

*Primary Examiner* — Chris Parry
*Assistant Examiner* — Weiwei Stiltner
(74) *Attorney, Agent, or Firm* — Jefferson IP Law, LLP

(57) ABSTRACT

A method for remotely controlling a home device in a mobile terminal is provided. The method includes receiving a chat message input to the mobile terminal for controlling at least one home device through an instant messenger application installed in the mobile terminal, and sending the chat message to a messenger server. The sent chat message is converted into a control command, which is sent to the home device.

23 Claims, 12 Drawing Sheets

METHOD AND APPARATUS FOR REMOTELY CONTROLLING HOME DEVICE IN HOME NETWORK SYSTEM

CROSS-REFERENCE TO RELATED APPLICATION(S)

This application claims the benefit under 35 U.S.C. § 119(a) of a Korean patent application filed on Sep. 5, 2013 in the Korean Intellectual Property Office and assigned Serial No. 10-2013-0106547, the entire disclosure of which is incorporated herein by reference.

TECHNICAL FIELD

The present disclosure relates to a home network system. More particularly, the present disclosure relates to a method and apparatus for remotely controlling an operation of a home device using a mobile terminal

BACKGROUND

A home network system denotes a system that connects various home devices installed in a home over a wired or wireless network to enable communication between the home devices.

The home network system may integrate home devices using a Home Gateway (HGW or H-GW), and connect the integrated home devices over an external public data network (e.g., an Internet Protocol (IP) network) to provide a desired service to a user who wants to control the home devices.

Recently, in line with the increasing diversity of home devices, the user needs have been increasingly diversified. Therefore, there is a need for efforts to provide the best service, accepting the various user needs.

In recent years, various methods have been developed to remotely control home devices using a mobile terminal of a user.

In the existing method, a home device may be remotely controlled only through a dedicated application agreed between the user and the home device. Therefore, the home device may not be remotely controlled, unless the dedicated application for controlling the home device is installed in the user's mobile terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for remotely controlling a home device using an instant messenger program universally installed in a mobile terminal, without installing a dedicated application for remotely controlling the home device in the mobile terminal.

In accordance with an aspect of the present disclosure, a method for remotely controlling a home device in a mobile terminal is provided. The method includes receiving a chat message input to the mobile terminal for controlling at least one home device through an instant messenger application installed in the mobile terminal, and sending the chat message to a messenger server. The sent chat message may be converted into a control command, which is sent to the home device.

In accordance with another aspect of the present disclosure, a method for remotely controlling a home device in a messenger server communicating with a mobile terminal is provided. The method includes receiving a chat message for controlling at least one home device through an instant messenger application of the mobile terminal, converting the chat message into a control message, and sending the converted control message to a home network server.

In accordance with further another aspect of the present disclosure, a mobile terminal for remotely controlling a home device is provided. The mobile terminal includes a storage unit configured to store an execution file of an instant messenger application, a controller configured to execute the execution file of the instant messenger application, and to receive a chat message input to the mobile terminal for controlling at least one home device through the executed instant messenger application, and a communication module configured to send the chat message to a messenger server.

In accordance with yet another aspect of the present disclosure, a method for remotely controlling at least one home device in a mobile terminal that includes a communication module configured to communicate with a messenger server, a storage unit configured to store an execution file of an instant messenger application, a controller configured to execute and control the instant messenger application, and a display configured to display an execution screen of the instant messenger application is provided. The method includes providing a chat list screen including a home device list in response to execution of the instant messenger application; providing a chat window for at least one home device selected from the home device list, and sending a chat message entered through the chat window to the messenger server, for control of the home device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An embodiment of the present disclosure will now be described in detail with reference to the accompanying drawings.

Figure 1:
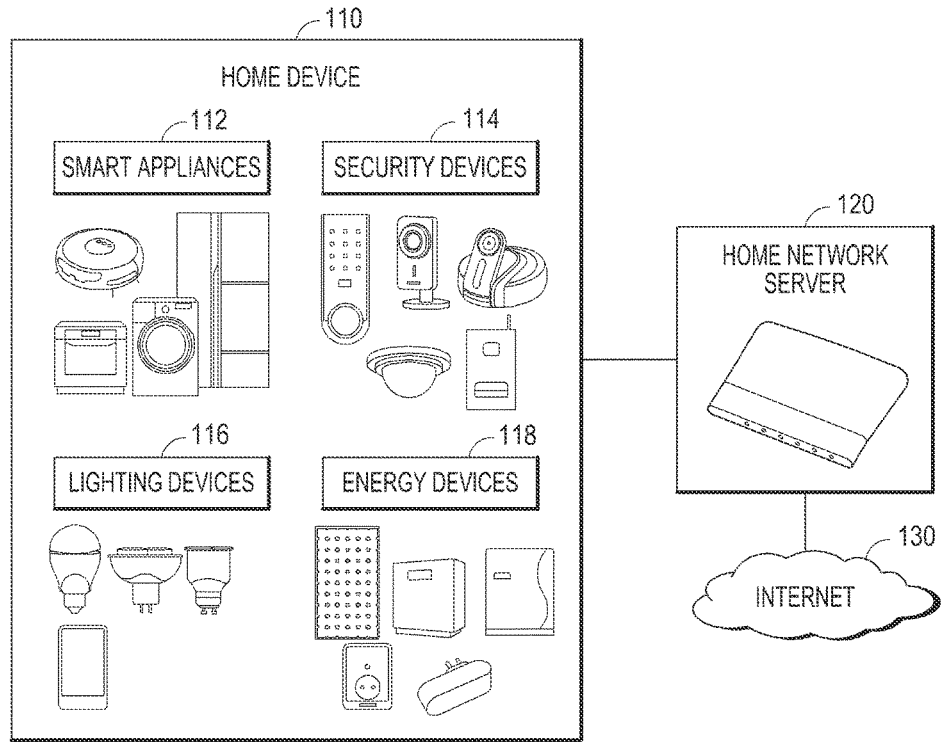
FIG. 1 is a block diagram illustrating a structure of a home network system according to an embodiment of the present disclosure.

FIG. 1 is a block diagram illustrating a structure of a home network system according to an embodiment of the present disclosure.

Referring to FIG. 1, the home network system may include home devices 110 each having control and communication functions, a home network server (or a home gateway) 120, and a communication network (or Internet) 130. The home devices 110 may include smart appliances 112, security devices 114, lighting devices 116 and energy devices 118, all of which are located in the home. For example, the smart appliances 112 may include a refrigerator, a washer, a robotic vacuum cleaner and the like. The security devices 114 may include a door lock, a security camera, a security sensor and the like. The lighting devices 116 may include a fluorescent lighting fixture, a Light Emitting Diode (LED) lighting fixture, and the like. The energy devices 118 may include a power meter, a power socket, an electrical outlet, a multi-tap, and the like. In addition, the home devices 110 may include a Personal Computer (PC), an Internet Protocol (IP) camera, an Internet phone, a wired/wireless phone, a home mobile phone, and the like.

The home devices 110 may be configured to communicate with the home network server 120 in accordance with a wired/wireless communication scheme, receive a control message sent from the home network server 120, and transmit requested information to the home network server 120.

The home network server 120 may include communication modules for communicating with the home devices 110 in accordance with the wired/wireless communication scheme, a storage unit for registering and storing information about the home devices 110, and a controller for controlling operations and states of the home devices 110 and collecting and managing necessary information from the home devices 110. The home network server 120 will be described in detail below with reference to FIG. 4.

Figure 2:
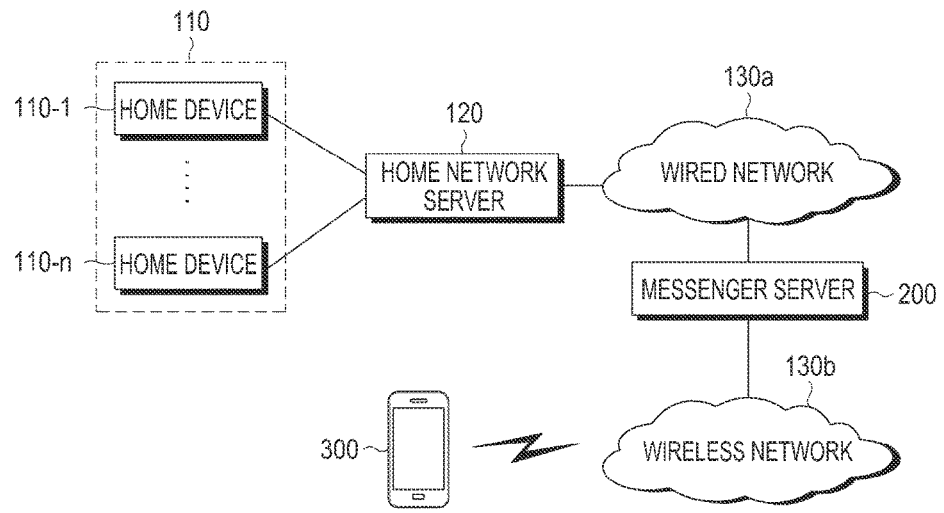
FIG. 2 is a block diagram illustrating a configuration of a home network system accessible by a mobile terminal according to an embodiment of the present disclosure.

FIG. 2 is a block diagram illustrating a configuration of a home network system accessible by a mobile terminal according to an embodiment of the present disclosure.

Referring to FIG. 2, the home devices 110 (110-1 to 110-*n*) in the home network system may be connected to the home network server 120 in accordance with the wired/wireless communication scheme. The home network server 120 may access a wireless network 130*b* or a wired network 130*a* such as the Internet.

The home network server 120 may allow access to a messenger server 200 (which is not located in the home) over the communication network 130 (including the wired network 130*a* and the wireless network 130*b*). The home network server 120 may send a control message received from the messenger server 200 to a relevant home device individually, or may send the control message to grouped home devices at the same time, for simultaneous control of the grouped home devices.

The communication network 130 may include at least one of an IP network such as the Internet, and a wireless network that a mobile terminal can access.

The home network system shown in FIG. 1 may provide, over the communication network 130, a home entertainment service such as Internet TeleVision (TV) (e.g., IPTV) and Video on Demand (VoD), a home data communication service such as data sharing, Voice over IP (VoIP) and video phone, and a home automation service such as remote control of home appliances, remote meter reading, and security and emergency services. In other words, the home network system in FIG. 1 may connect all types of home devices used inside and outside the home over one network to control them. Therefore, the term 'in or inside the home' as used herein may be construed to include even 'outside the home' as long as a home device located outside the home can be connected over one network and controlled.

A user may remotely control the home network server 120 installed in the home network system, or may remotely control each home device 110 over the home network server 120, using an instant messenger application (or a messenger application) installed in his/her external communication terminal (e.g., wireless communication equipment such a mobile terminal). The mobile terminal may include, for example, a Personal Digital Assistant (PDA), a smart phone, a cellular phone, a tablet computer, a laptop computer and the like, all of which have a communication function. The mobile terminal may access the home network system over the Internet and the operator network.

A mobile terminal 300 may access the wireless network 130b that includes a wireless access network and an operator core network. The mobile terminal 300 may access the messenger server 200 via the wireless network 130b. The wireless network 130b may include, for example, a $2^{nd}$ Generation (2G) or $3^{rd}$ Generation (3G) cellular communication system, a $4^{th}$ Generation (4G) communication system, a Long-Term Evolution (LTE) communication system, a World Interoperability for Microwave Access (WiMAX) communication system, and the like. A detailed description of the mobile terminal 300 will be made below with reference to FIG. 5.

The messenger server 200 may access the home network server 120 via the wired network 130a, and access the mobile terminal 300 via the wireless network 130b.

An instant messenger application may be installed in the mobile terminal 300 by the user. Alternatively, the instant messenger application may be installed in advance before the user purchases the mobile terminal 300. Using the instant messenger application, the user may separately control an operation of the home network server 120 or operations of the home devices 110 connected to the home network server 120, or may control, in common, operations of grouped home devices.

If the messenger application is executed, a control command in the form of a chat message may be sent to the messenger server 200 from the mobile terminal 300 in response to a user input. The messenger server 200 may convert the control command in the form of a chat message into a control message agreed between the user and the home network server 120, and send the converted control message to the home network server 120. The home network server 120 may check identification information and control command for a home device, which are included in the received control message, and control an operation of the identified home device 110 in response to the control command.

Figure 3:
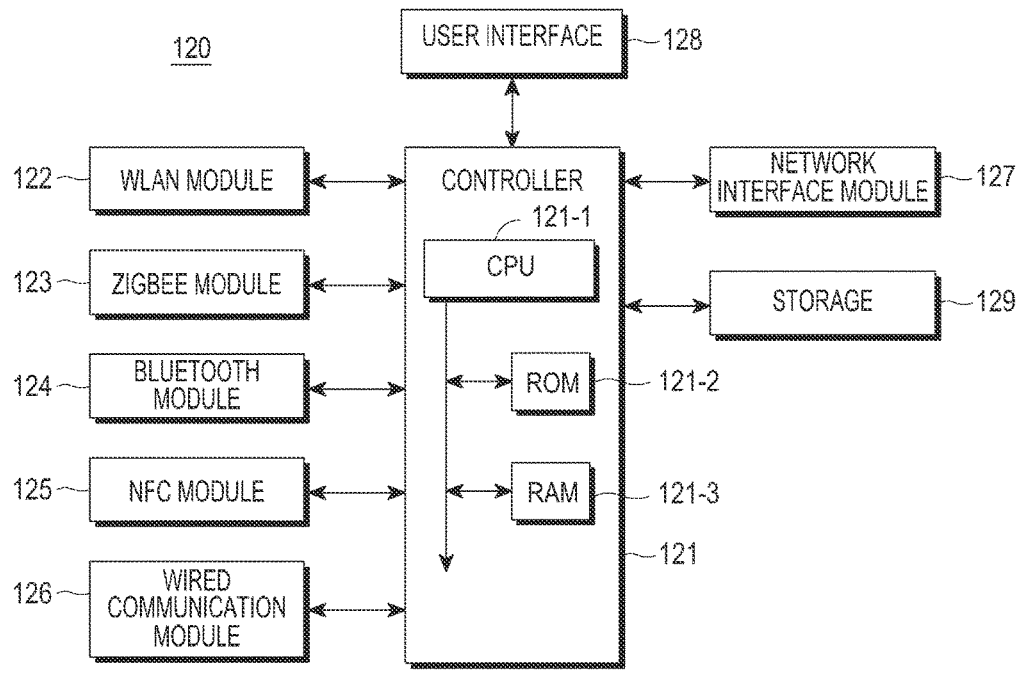
FIG. 3 is a block diagram illustrating a configuration of a home network server according to an embodiment of the present disclosure.

FIG. 3 is a block diagram illustrating a configuration of a home network server according to an embodiment of the present disclosure.

Referring to FIG. 3, the home network server 120 may be connected to at least one of home devices 110-1 to 110-n using at least one of communication modules 122 to 126. The communication modules 122 to 126 may include at least one of a Wireless Local Area Network (WLAN) module 122 (e.g., Wireless Fidelity (WiFi)), a ZigBee module 123, a Bluetooth module 124, a Near-Field Communication (NFC) module 125, and a wired communication module 126. In addition, the home network server 120 may further include at least one of a controller 121, a network interface module 127, a User Interface (UI) 128, and a storage unit 129.

The controller 121 may include at least one of a Central Processing Unit (CPU) 121-1, a Read-Only Memory (ROM) 121-2 storing a control program for control of the home network server (or the home gateway) 120, and a Random Access Memory (RAM) 121-3 that is used as a memory area for operations performed in the home network server 120. The controller 121 may communicate with the home devices 110-1 to 110-n through the communication modules 122 to 126 in response to execution of programs stored in the ROM 121-2 or the RAM 121-3, or of application programs stored in the storage unit 129. The controller 121 may generate a control command that is sent to the home devices 110-1 to 110-n, or may store information collected from the home devices 110-1 to 110-n in the storage unit 129.

The user interface 128 may include an output module (not shown) such as a display, a speaker and an alarm lamp, and an input module (not shown) such as a touch screen, a keypad and a microphone. The user may use the user interface 128 to directly control the home network server 120, to register or remove the home devices 110-1 to 110-n in/from the home network server 120, or to control the home devices 110-1 to 110-n via the home network server 120.

The network interface module 127 may be, for example, an Internet communication module, and may connect the home network server 120 to the external network.

The storage unit 129 may be configured to store, under control of the controller 121, a program code, data or information used for operation of the home network server 120. The storage unit 129 may store a large amount of data provided from the external devices or the home devices 110-1 to 110-n.

Figure 4:
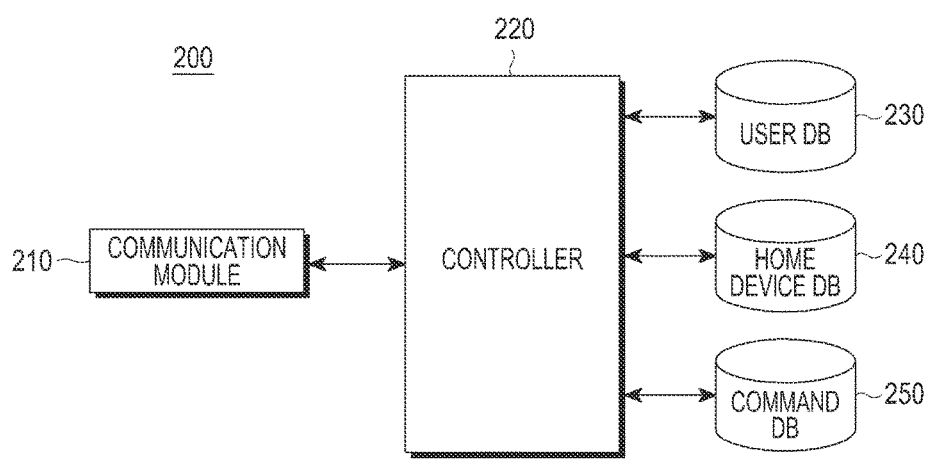
FIG. 4 is a block diagram illustrating a configuration of a messenger server according to an embodiment of the present disclosure.

FIG. 4 is a block diagram illustrating a configuration of a messenger server according to an embodiment of the present disclosure.

Referring to FIG. 4, the messenger server 200 may include a communication module 210, a controller 220, a user DataBase (DB) 230, a home device DB 240, and a command DB 250.

The communication module 210 may be configured to communicate with the mobile terminal 300 via the wireless network 130b, and may be configured to communicate with the home network server 120 via the wired network 130a. The communication module 210 may receive a chat message from the mobile terminal 300 via the wireless network 130b, and send a control message corresponding to the chat message to the home network server 120 via the wired network 130a.

The controller 220 may control and manage the overall operation of the messenger server 200. The controller 220 may manage and control the user DB 230 storing user information of the mobile terminal 300, and the home device DB 240 storing home device information of the home device that is registered for the mobile terminal 300 or the user. In addition, the controller 220 may manage and control the command DB 250 storing a variety of control commands in the form of a chat message, which were registered in advance by the user to control the home device.

Figure 5:
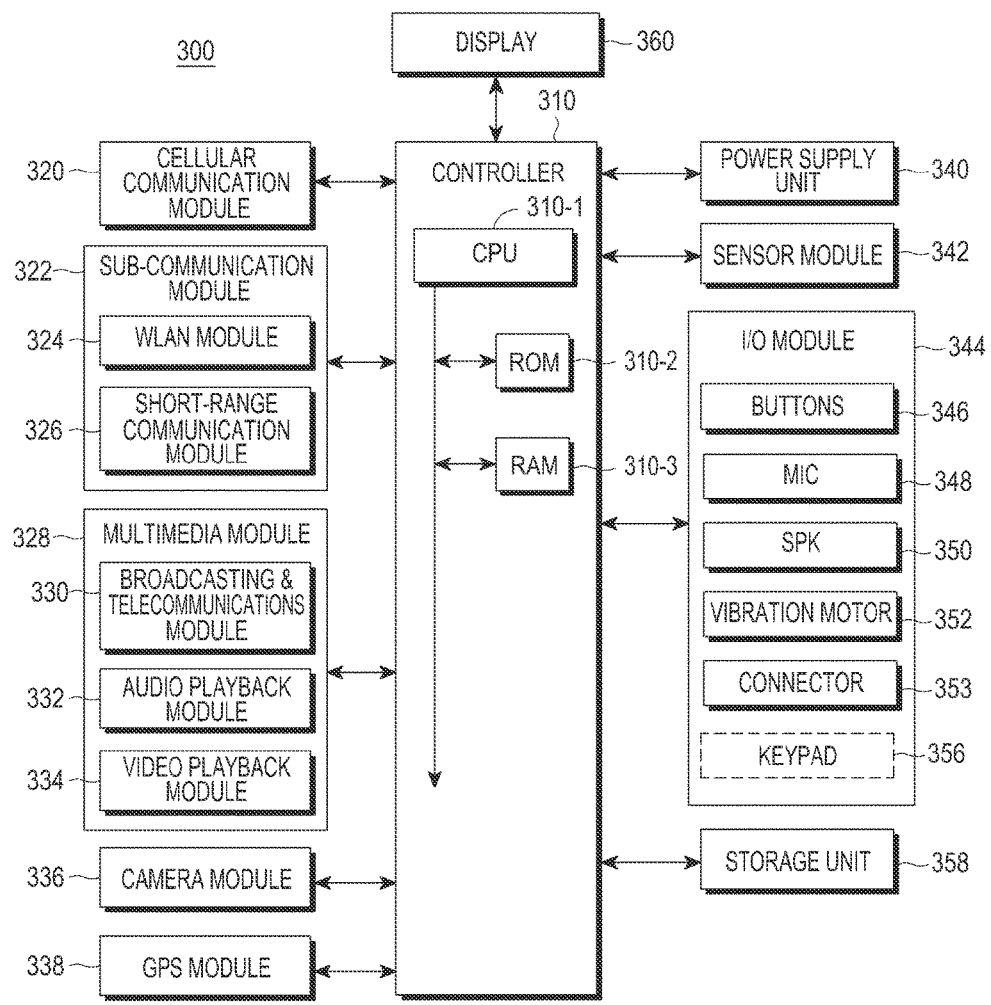
FIG. 5 is a block diagram illustrating a configuration of a mobile terminal according to an embodiment of the present disclosure.

FIG. 5 is a block diagram illustrating a configuration of a mobile terminal according to an embodiment of the present disclosure. For a better understanding of the description, reference will be made to FIGS. 1 to 4.

Referring to FIG. 5, the mobile terminal 300 may include at least one of a controller 310, a cellular communication module 320, a sub-communication module 322, a multimedia module 328, a camera module 336, a Global Positioning System (GPS) module 338, an Input/Output (I/O) module 344, a sensor module 342, a storage unit 358, a power supply unit 340 and a display 360.

The camera module 336 and the GPS module 338 may be optional. The sub-communication module 322 may include at least one of a WLAN module 324 and a short-range communication module 326. The multimedia module 328 may include at least one of a broadcasting & telecommunications module 330, an audio playback module 332 and a video playback module 334. The camera module 336 may include at least one camera, and the I/O module 344 may include at least one of a button set 346, a microphone (MIC) 348, a speaker (SPK) 350, a vibration motor 352, a connector 353, and a keypad 356.

The controller 310 may include a CPU 310-1, a ROM 310-2 storing a control program for controlling the overall operation of the mobile terminal 300, and a RAM 310-3 that temporarily stores the signals or data received from the outside of the mobile terminal 300, or is used as a memory area for operations performed in the mobile terminal 300.

The cellular communication module 320, under control of the controller 310, may connect the mobile terminal 300 to an external device (e.g., a base station of the cellular system) via at least one or multiple antennas (not shown), using wireless access technology based on the cellular communication protocol. The cellular communication module 320 may transmit and receive radio signals containing voice calls, video calls, Short Messaging Service (SMS) messages or Multimedia Messaging Service (MMS) messages, to/from other devices capable of communication. The cellular communication module 320 may transmit and receive radio signals containing short data for control of an application and the like.

The WLAN module 324, under control of the controller 310, may access the Internet in the place where a wireless Access Point (AP) (not shown) is installed. The short-range communication module 326, under control of the controller, may perform wireless short-range communication between the mobile terminal 300 and the external devices. The type of short-range communication may include Bluetooth, ZigBee, Infrared Data Association (IrDA), and the like.

The display 360 may display information about various applications (e.g., call application, data transfer application, broadcast application, camera application and the like) including an instant messenger application executable by the controller 310, and may include a touch screen providing user interfaces configured to be adapted to the applications. The controller 310 may select a soft key displayed on the display 360 in response to a user gesture detected on the display 360, or may execute an application or function corresponding to the soft key. The user gesture may include a touch by a finger or a tool, and motion recognition by the human body.

The instant messenger application may be installed in the ROM 310-2 or the storage unit 358 of the mobile terminal 300, and if the instant messenger application is executed, the instant messenger application may provide various user interfaces (or user interface screens) as shown in FIGS. 10B to 10G and FIGS. 11A and 11B, which will be described in detail below, generate a control command for controlling an operation of the home device 110 (in FIG. 1) in response to the user's key input or touch input which is entered to the user interface, or to a gesture input that is made using an acceleration sensor, a gyro sensor or the like, and send the control command to the messenger server 200 (in FIG. 2).

The storage unit 358 may store the operating status information and operation processing result information of the home devices 110, which are provided from the home network server 120 via the messenger server 200 (in FIG. 2) in response to the various applications, content and data, and to the remote control of the present disclosure.

Figure 6:
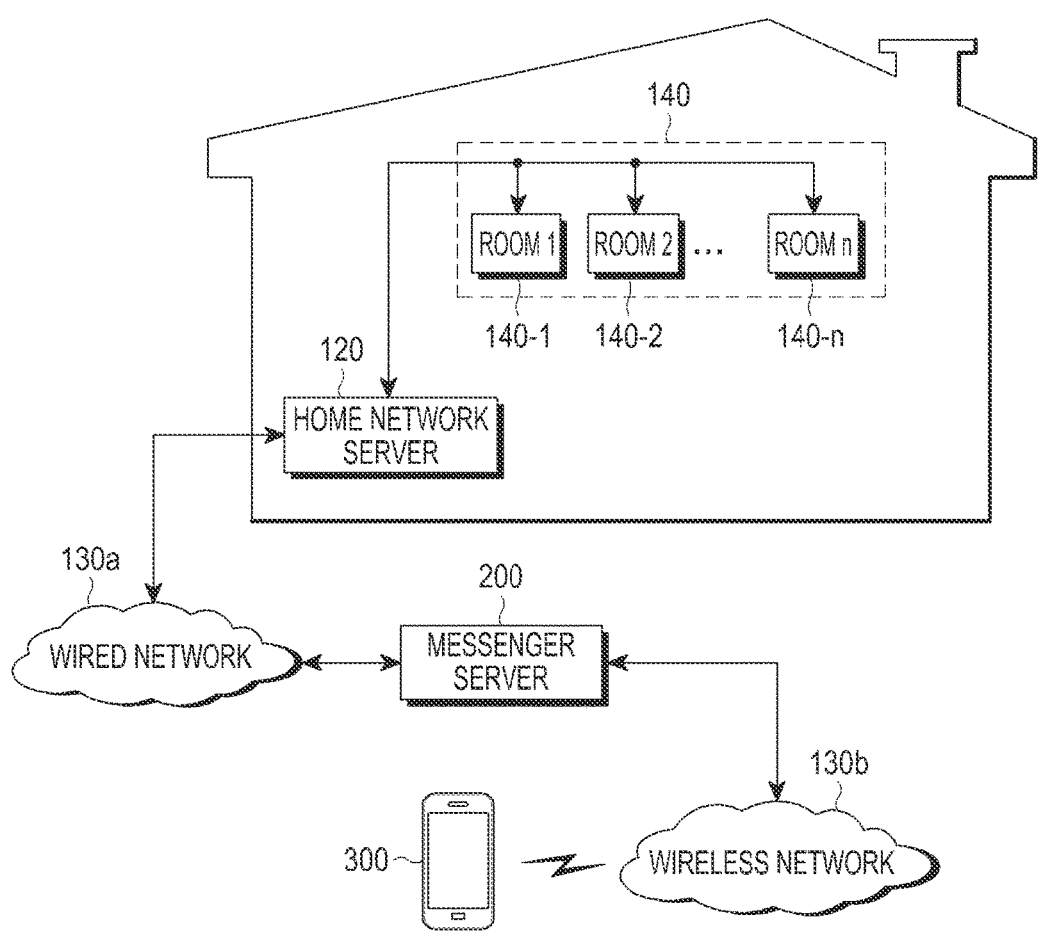
FIG. 6 is a block diagram illustrating a configuration of a home network system for remotely controlling operations of home devices according to an embodiment of the present disclosure.

FIG. 6 is a block diagram illustrating a configuration of a home network system for remotely controlling operations of home devices according to an embodiment of the present disclosure.

In the embodiment of FIG. 6, the home network server 120 may register information about multiple home devices 140, collect the operating status information or information on the operation processing corresponding to the operations of the home devices 140 periodically or based on a request, and check the operating status or operation processing results of each of the home devices 140.

As for the multiple home devices 140, their locations may be registered individually for each room in the home. In FIG. 6, reference numerals 140-1 to 140-n each represent at least one home device located in each room.

The home network server 120 may receive a control message for controlling the home devices 140 from the messenger server 200 via the wired network 130a, and transmit the operating status information of the home devices 140 that are controlled in response to the control message, to the mobile terminal 300 via the wireless network 130b.

The home network server 120 may store location information indicating device locations for each room in the home, and register and manage the locations of the home devices 140 for each room. The location information may be provided to the home network server 120 from a server (not shown) of the operator that builds the home network system, or may be the information that the user has directly input to the home network server 120 using a personal computer capable of accessing the wired network 130a. As for the location information, if the user's home address is entered through the portal site provided by the operator, the location information may be provided in a form including floor plans of a variety of designs, which are selective or editable.

The user may directly register the current locations of the home devices 140 in the home network server 120, or may detect the current locations of the home devices 140 using a Radio Frequency (RF) tag, a sensor and the like mounted in each of the home devices 140. The location information of the home devices 140 may be mapped to names of the rooms where the home deices 140 are located. For example, a refrigerator may be mapped to the kitchen, and a TV may be mapped to the living room. As for the location information, each home device may have information about the location where the home device is generally installed, as a default value.

In the home network system of FIG. 6, the home network server 120 may register information about the home devices 140 installed in the home, and control and manage the registered home devices 140. For example, if a new home device is installed, the home network server 120 may collect and store information about the new home device (e.g., identifier, capacity information and operating status information of the home device). The information about the home device may be directly obtained from the home device 140 through a service discovery procedure between the home network server 120 and the home device 140, or may be transmitted to the home network server 120 from an Internet server based on the identification information provided from the home device 140, or may be directly input to the home network server 120 by the user or the system administrator. If the user purchases and installs a new home device, and inputs, to the home network server 120, identification information (e.g., a serial number, a model number, a Quick Response (QR) code and the like) provided through the home device or the user's guide for the home device, the home network server 120 may access the manufacturer's server over the Internet based on the identification information of the home device to obtain information about the home device.

The information about the home devices 140 registered in the home network server 120 may be registered in the same way even in the messenger server 200. In other words, the user may transmit home device-related information (e.g., identification information of a home device, in-home location information of each home device, and the like) to the messenger server 200 using the personal computer capable of accessing the wired network 130*a*. As for the in-home location information of each home device, among the home device-related information, if the user's home address is entered through the portal site provided by the operator of the messenger server 200, the location information may be provided in a form including floor plans of a variety of designs, which are selective or editable. The home device-related information provided to the messenger server 200 may be stored in the home device DB 240 (in FIG. 4) interworking with the messenger server 200.

Figure 7:
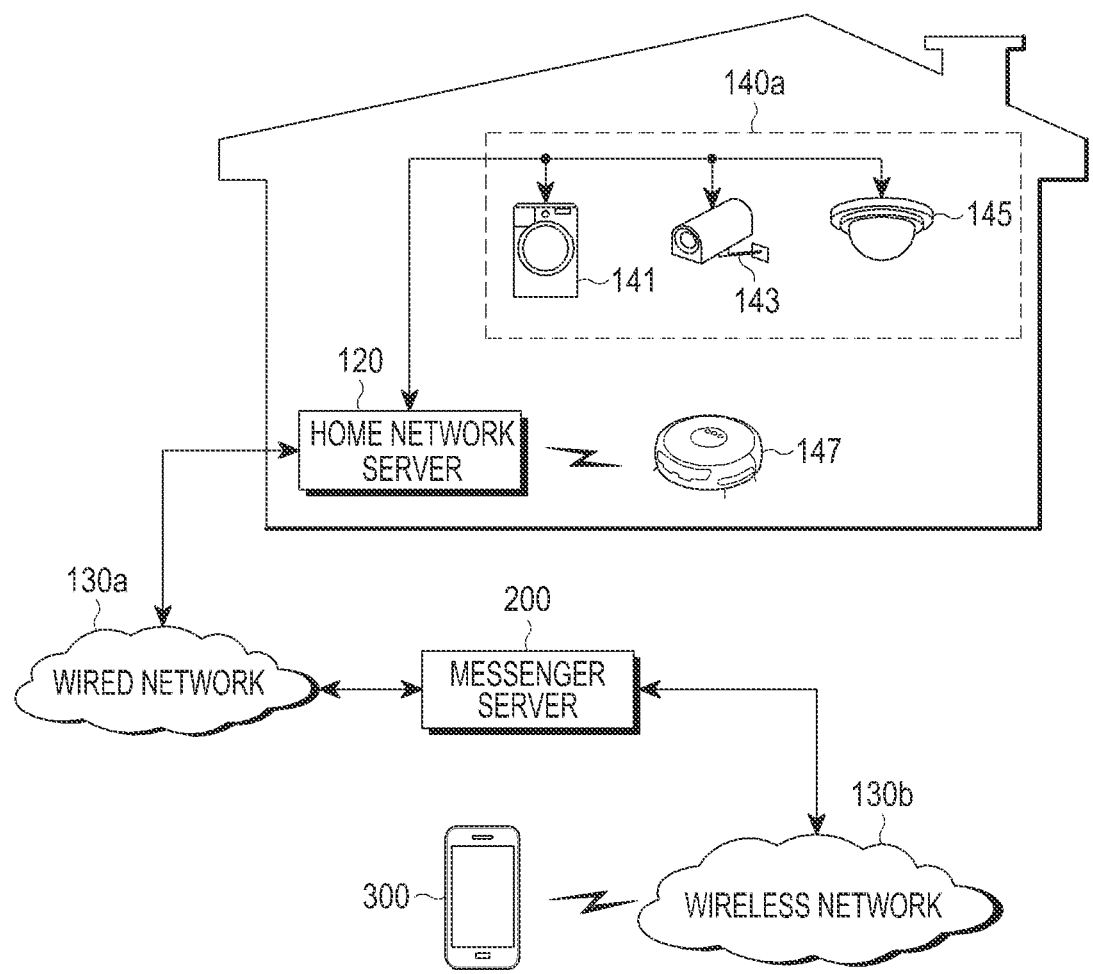
FIG. 7 is a block diagram illustrating a configuration of a home network system for remotely controlling operations of home devices using an instant messenger according to an embodiment of the present disclosure.

FIG. 7 is a block diagram illustrating a configuration of a home network system for remotely controlling operations of home devices using an instant messenger according to an embodiment of the present disclosure.

In the example of FIG. 7, the home network system may control an operation of a washer 141 located in one room (e.g., a laundry room) through a messenger interface provided by an instant messenger application, and may also control an operation of a robot vacuum cleaner 147 located in another room (e.g., a living room).

It will be assumed in FIG. 7 that the washer 141, a Closed-Circuit Television (CCTV) 143 and an electric lighting 145 are installed in a room (e.g., the laundry room) as fixed home devices 140*a*. The fixed home devices 140*a* may be connected to the home network server 120 through a wired interface or a wireless interface. It will be assumed that the robotic vacuum cleaner 147 having a moving function is located in another room (e.g., the living room) as a mobile home device. The robotic vacuum cleaner 147 may be connected to the home network server 120 via a wireless interface.

In the example of FIG. 7, for operation control of the washer 141, a control command in the form of a chat message that is entered through an executed instant messenger application may be sent to the messenger server 200 through the mobile terminal 300, and the messenger server 200 may search the command DB 250 (in FIG. 4) for a control message mapped to a control command in the form of a chat message, and send the found control message to the home network server 120. The home network server 120 may control an operation of the washer 141 in response to the control command included in the received control message. The home network server 120 may also control an operation of the robotic vacuum cleaner 147 in the same way.

Figure 8:
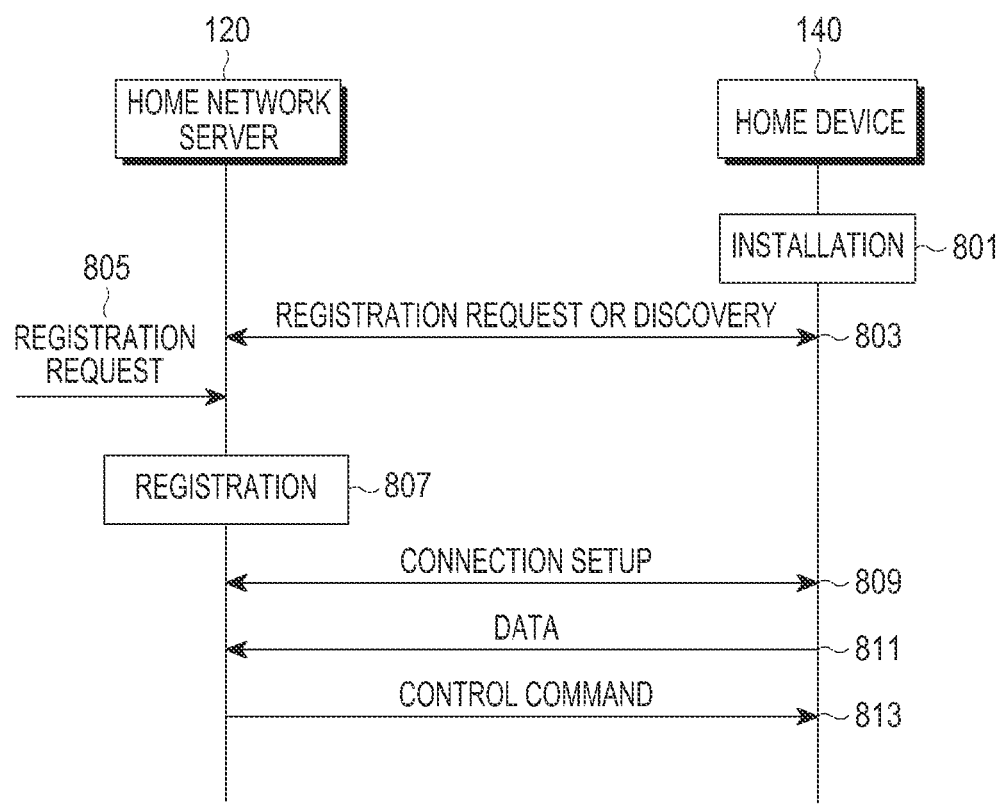
FIG. 8 is a flow diagram illustrating a registration process of registering a home device in a home network server according to an embodiment of the present disclosure.

FIG. 8 is a flow diagram illustrating a registration process of registering a home device in a home network server according to an embodiment of the present disclosure.

Referring to FIG. 8, a home device 140 may be installed and powered on, in operation 801.

In operation 803, the home network server 120 may perform a discovery procedure for the home device 140. For example, if the home device 140 is connected to the home network server 120 by WiFi, the home network server 120 may perform a discovery procedure for a nearby new home device periodically or at the request of the user. Upon detecting the home device 140 through the discovery procedure, the home network server 120 may receive home device information from the detected home device 140. The home device information may include at least one of identification information and performance information of the home device 140. Optionally, the identification information may include a product code indicating the product type (e.g., an air conditioner, a refrigerator, an LED lighting, and the like) of the home device 140.

Optionally, in operation 805, the home network server 120 may receive a registration request for the home device 140 that the user desires to register, directly from the user via a computer over the Internet, and may also receive information about the home device 140 from the user. As another example, the home network server 120 may obtain identification information for the home device 140 from the home device 140 or the user, and access the manufacturer's server for the home device 140 based on the identification information to obtain performance information about the home device 140.

In operation 807, the home network server 120 may store information about the home device 140, and manage the home device 140 that is registered using the stored information about the home device 140. Optionally, the home network server 120 may receive additional information about the home device 140 directly from the user, or from a remote terminal over the Internet, WiFi or the like. The additional information may include, for example, at least one of the name or nickname of the home device 140, and the location where the home device 140 is installed.

Optionally, the home network server 120 may receive additional information about an operation mode and/or rights of the home device 140 directly from the user, or from a remote terminal over the Internet, WiFi or the like. The additional information may include, for example, a level of the access rights to the home device 140. The level of the access rights may include, for example, (i) allowance of the access only via the home network server 120, (ii) allowance of the access by the remote terminal registered in the messenger server 200, (iii) allowance of the access by the remote terminal registered in the home network server 120, or the like.

In operation 809, the home network server 120 may set up its connection to the home device 140. The setup of the connection may be performed by a procedure determined in accordance with a WiFi, a ZigBee, a Bluetooth, an NFC or a wired communication scheme, depending on the communication scheme between the home network server 120 and the home device 140. If a connection is set up between the home network server 120 and the home device 140, the home device 140 may transmit data for the home device 140 to the home network server 120 in operation 811.

In operation 813, the home network server 120 may send a control command to the home device 140. Optionally, the control command may be set considering the product type of the home device 140, to meet the characteristics of the product. The control command may be set to keep the current operating status, or to change the operating status step by step. The control command may be set in common for multiple home devices 140, or different control commands may be set for the multiple home devices 140. Although it will be described in detail below, the control command may be sent from the messenger server 200 to the home network server 120, and the home network server 120 may forward the control command to the home device 140.

Figure 9:
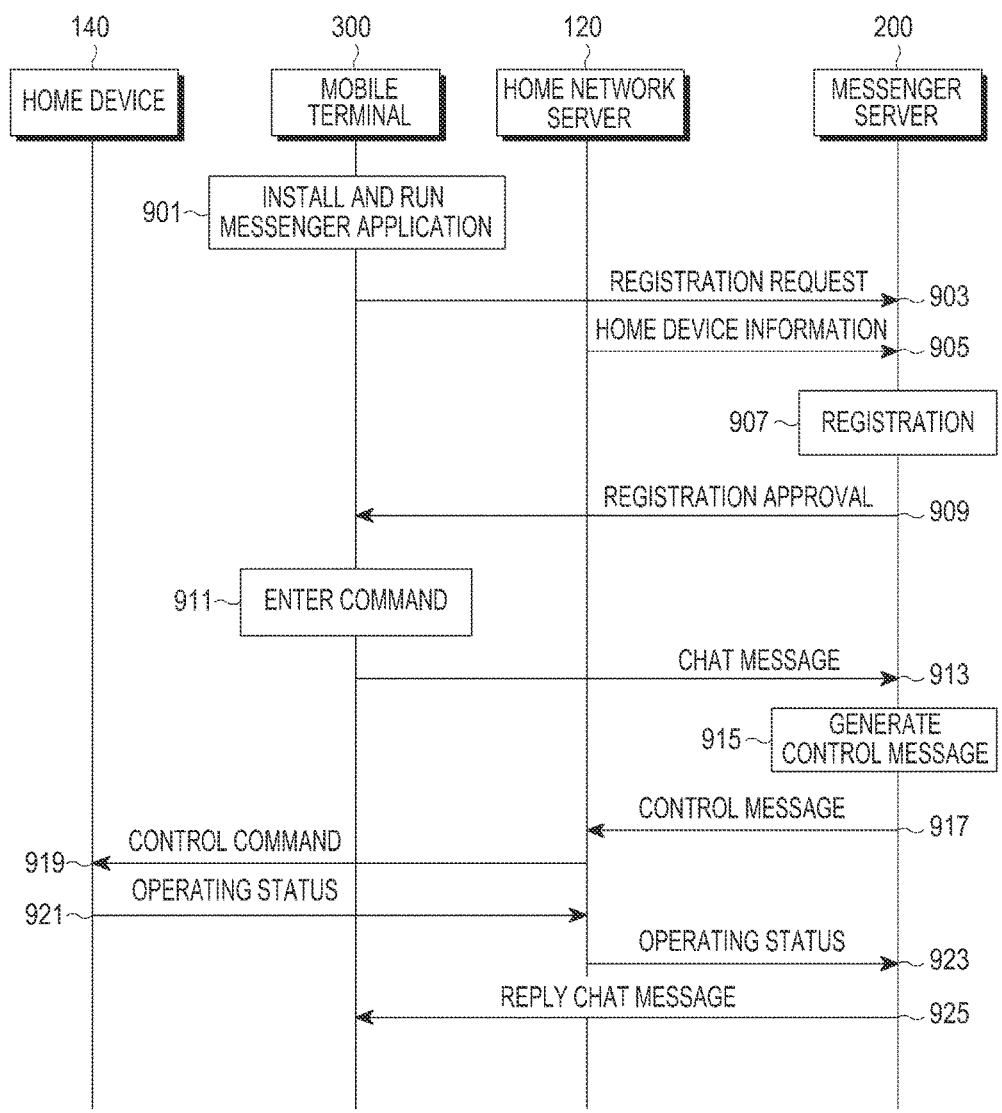
FIG. 9 is a flow diagram illustrating a process of registering a home device in a messenger server through an instant messenger application and a process of remotely controlling the registered home device according to an embodiment of the present disclosure.

FIG. 9 is a flow diagram illustrating a process of registering a home device in a messenger server through an instant messenger application and a process of remotely controlling the registered home device according to an embodiment of the present disclosure.

Referring to FIG. 9, the mobile terminal 300 may execute or run an instant messenger application (or a messenger application) for remote control of a home device, in operation 901. Optionally, the mobile terminal 300 may further perform an operation of installing the messenger application.

In operation 903, the mobile terminal 300 may send a registration request message for the home device 140 to the messenger server 200 through the executed instant messenger application. The registration request message may include, for example, information about the home device 140 registered in the home network server 120, a control command in the form of a chat message, which is for controlling the home device 140, information about the mobile terminal 300, user authentication information, and the like.

The information about the home device 140 may include at least one of identification information and performance information of the home device 140. Optionally, the identification information may include a product code indicating the product type (e.g., an air conditioner, a refrigerator, an LED lighting, and the like) of the home device 140. The control command in the form of a chat message may be a text that the user of the mobile terminal 300 has arbitrarily set. For example, the control command may be a text in the form of a universal chat message, which is exchanged between users in the chat environment, such as "power on", "power off", "turn up the temperature", "turn down the temperature", "turn on the lighting", "turn off the lighting", and the like. As another example, the control command may be a text in the form of a chat message, which can simultaneously control home devices existing in a specific location in the home, or home devices that can be grouped in the same category, such as "turn on the lighting in the bathroom", "turn off the lighting in the living room", "turn off the lightings #1, #2 and #3 in the living room", "turn on all the rights in rooms #1, #2 and #3", and the like.

The information about the mobile terminal 300 may be the user information that is registered in advance to use the messenger service. For example, the information about the mobile terminal 300 may include the user name registered during subscription to the messenger service, the phone number of the mobile terminal, the ID and password set by the user, and the like.

In operation 905, the messenger server 200 may receive the home device information from the home network server 120 over the wired network 130*a*. In operation 907, the messenger server 200 may determine whether there is information matching the home device information included in the registration request message from the mobile terminal 300 among the home device information received from the home network server 120, and if there is the matching information, the messenger server 200 may store the home device information and the control command in the form of a chat message, which the user has set for the home device, in the home device DB 240 (in FIG. 4) and the command DB 250 (in FIG. 4), respectively, completing the registration.

In operation 909, the messenger server 200 may send a registration approval message indicating the successful registration of the home device information, to the mobile terminal 300.

Thereafter, the mobile terminal 300 may send a control command for remotely controlling the home device to the home device, using the instant messenger application.

For example, upon receiving in operation 911*a* text command through a chat window that the instant messenger application provides to remotely control the home device, the mobile terminal 300 may send the text command to the messenger server 200 as a chat message in operation 913.

The messenger server 200 may generate a control message corresponding to the chat message with reference to the command DB 250 (in FIG. 4) in operation 915, and send the control message to the home network server 120 in operation 917.

In operation 919, the home network server 120 may send a control command corresponding to the control message to the home device 140 through the wired/wireless interface. The home device 140 may change its current operating status in response to the control command. In operations 921 and 923, the changed operating status information may be transmitted to the messenger server 200 via the home network server 120. In operation 925, the messenger server 200 may transmit the operating status information to the mobile terminal 300 as a reply chat message.

FIGS. 10A to 10G illustrate examples of various user interface screens displayed on a mobile terminal during execution of remote control according to an embodiment of the present disclosure.

Figure 10A:
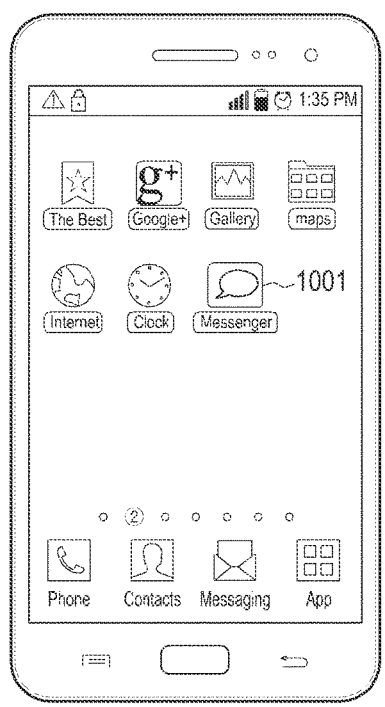
FIGS. 10A, 10B, 10C 10D, 10E, 10F, and 10G illustrate examples of various user interface screens displayed on a mobile terminal during execution of remote control according to an embodiment of the present disclosure.

Referring to FIGS. 10A to 10G, if the user desires to remotely drive or control the home device 140, the user may execute or run the messenger application for remote control of the home device 140, on the mobile terminal 300. To this end, as illustrated in FIG. 10A, the mobile terminal 300 may provide a messenger icon 1001 for execution of an instant messenger application. Upon detecting a user gesture (e.g., a touch) for the messenger icon 1001, the mobile terminal 300 may execute the instant messenger application.

Figure 10B:
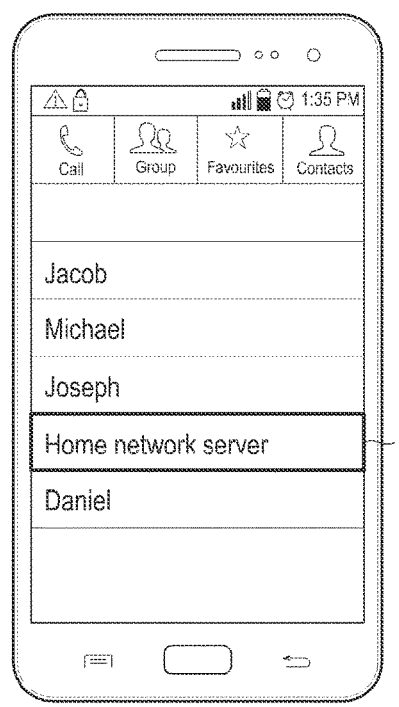
Figure 10C:
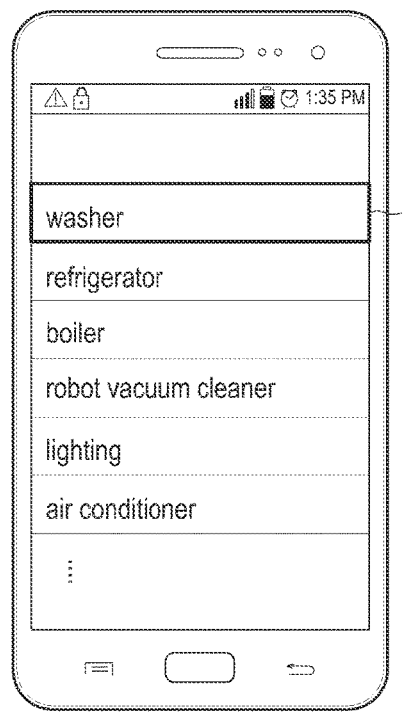

If the instant messenger application is executed, the mobile terminal 300 may provide a chat list screen registered by the user as illustrated in FIG. 10B. In a chat list displayed on the chat list screen may be displayed a 'home network server' item 1003 together with a friend list made up of the user's friends. If the user selects the 'home network server' item 1003, the mobile terminal 300 may provide a list of home devices that the user has registered in advance, as illustrated in FIG. 10C. In other words, the list of home devices may be configured to form a sub-category of the 'home network server' item 1003. In an alternative embodiment, the friend list and the home device list may be displayed together in the chat list of FIG. 10B.

Figure 10D:
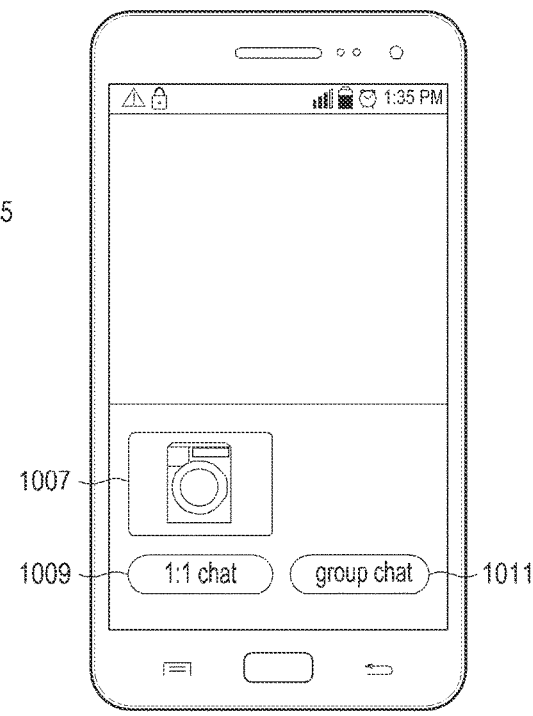

In this embodiment, remote control of a washer will be considered. If the user selects a 'washer' item 1005 in FIG. 10C, a chat type selection screen for asking a chat type for the selected washer may be provided as illustrated in FIG. 10D. On the chat type selection screen may be provided an icon 1007 in the form of a washer, and a '1:1 chat' menu 1009 and a 'group chat' menu 1011 disposed under the icon 1007.

Figure 10E:
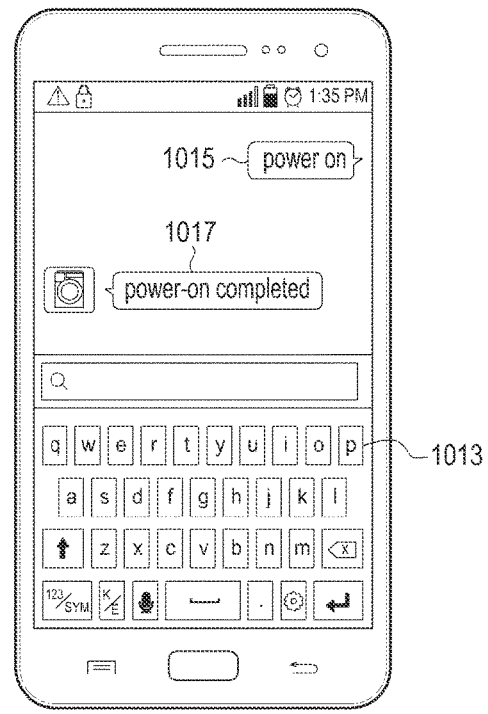

If the '1:1 chat' menu 1009 is selected in response to a user input, a chat window including soft keys 1013 may be provided as illustrated in FIG. 10E. If a text such as 'power on' 1015 is input using the soft keys 1013, the mobile terminal 300 may provide (or display) a text command of 'power on' 1015 in the chat window, generate a chat message in the form of a packet at the same time using the text command and the identification information indicating the washer, and send the chat message to the messenger server 200 over the communication network. In response, the messenger server 200 may generate a control message mapped to the text command included in the received chat message with reference to the command DB 250 (in FIG. 4), and send the control message to the home network server 120. Based on the identification information of the washer, which is included in the received control message, the home network server 120 may determine that the control target is a washer and the control message corresponds to a control command to power on. Then, the home network server 120 may send, to the washer, a control command to turn on power of a washer.

The home network server 120 may receive, from the washer, the results of processing (e.g., operating status information of the washer) performed in response to the control command, and transmit the operating status information to the messenger server 200. The messenger server 200 may convert the operating status information into a format of a chat message, and send the chat message to the mobile terminal 300. For example, if the washer is powered on while it was powered off, the messenger server 200 may send a chat message indicating completion of power-on to the mobile terminal 300. The mobile terminal 300 may provide a chat message such as 'power-on completed' 1017 to the user as illustrated in FIG. 10E. By providing the chat message to the user, the mobile terminal 300 may allow the user to check the processing results for the control message that the mobile terminal 300 sent in the form of a chat message.

Figure 10F:
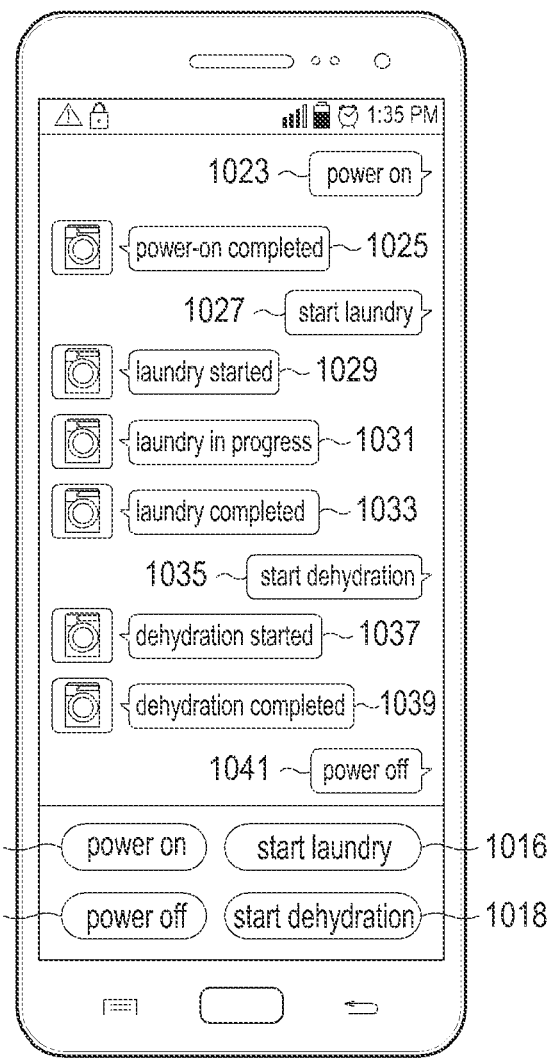

Instead of directly inputting the text command in the chat window using the soft keys as illustrated in FIG. 10E, the user may input his/her desired text command using pre-registered text menus 1014, 1016, 1018 and 1020 as illustrated in FIG. 10F. In other words, the user may select a text menu by a touch input corresponding to his/her desired text command from among the text menus 1014, 1016, 1018 and 1020, to input a text command. With the use of the touch input, the user may input a desired text command by simply selecting a desired text menu, without directly inputting the text command using the soft keys. For example, if the user selects a message menu of 'power on' 1014, a chat message of 'power on' 1023 may be automatically displayed in a chat window 1100, and at the same time, the chat message may be sent to the messenger server 200. In the subsequent operation, as described in FIG. 10E, if the home network server 120 receives the operating status information of the washer and transmits the operating status information to the messenger server 200, the messenger server 200 may convert the operating status information into a chat message and send the chat message to the mobile terminal 300.

As described in FIG. 10E, if the operating status of the washer is switched from a power-off state to a power-on state, the mobile terminal 300 may provide a chat message such as 'power-on completed' 1025 to the user.

Similarly, if the user selects the 'start laundry' menu 1016, a chat message 1027 corresponding to the 'start laundry' menu 1016 may be automatically displayed in the chat window, and at the same time, the chat message may be sent to the washer in the form of a packet.

The washer may send the laundry progress situation such as 'laundry started' 1029, 'laundry in progress' 1031, 'laundry completed' 1033 and the like to the mobile terminal 300 via the home network server 120 and the messenger server 200 in real time as a reply chat message. If the mobile terminal 300 receives the chat message of 'laundry completed' 1033, the user may select a text menu command such as 'start dehydration' 1018. At which point, a chat message of 'start dehydration' 1035 is sent and then a chat message of 'dehydration started' 1037 is received to/from the washer. If the washer completes the dehydration, the mobile terminal 300 may receive a chat message of 'dehydration completed' 1039. If all the laundry is terminated, the user may select a text menu command of 'power off' 1020 and send a chat message 1041 corresponding to the text menu command to the washer. In response, the washer may turn off its power, and if the power-off is completed, a reply chat message of 'power-off completed' may be sent to the mobile terminal 300. In this way, the user may check the laundry progress situation from the laundry start to the power-off in real time, using the reply chat message.

If the washer is in an inoperable state where it cannot execute the user's control command, or is in a mal-operation state, the home network server 120 may inform the messenger server 200 of the washer's inoperable or mal-operation state. Then, the messenger server 200 may convert the home device's inoperable or mal-operation state into a chat message, and send the chat message to the mobile terminal 300.

Although a washer is remotely controlled using a chat message in the example of FIGS. 10A to 10G, it will be apparent to those of ordinary skill in the art that other types of home devices may also be remotely controlled using a chat message. For example, in a case where the user desires to remotely control a vacuum cleaner, if the user directly inputs a text command such as 'drive cleaner', 'start cleaning' or the like as in FIG. 10E, or if the text command is received through a text menu command as in FIG. 10F, the messenger server 200 may receive a chat message corresponding to the text command or the text menu command, and send a control command corresponding to the chat message to the home network server 120.

Figure 10G:
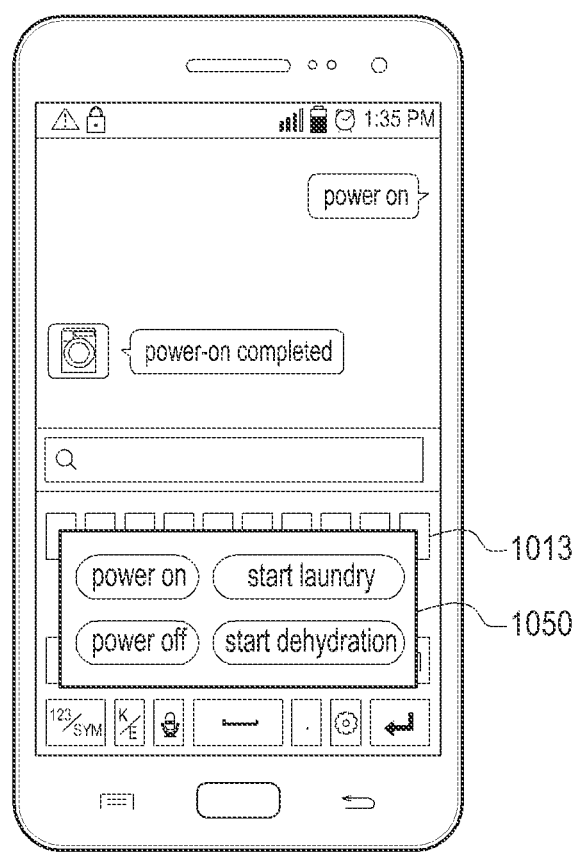

The text menu commands 1014, 1016, 1018 and 1020 in FIG. 10F may be activated in the form of a pop-up window. For example, if the user selects a specific key among the soft keys 1013 in FIG. 10E, the text menu commands 1014, 1016, 1018 and 1020 in FIG. 10F may be provided in the form of a pop-up window 1050, as illustrated in FIG. 10G. By selecting the text menu commands provided in the form of the pop-up window 1050, the user may easily input text commands without directly inputting the text commands using the soft keys.

Figure 11A:
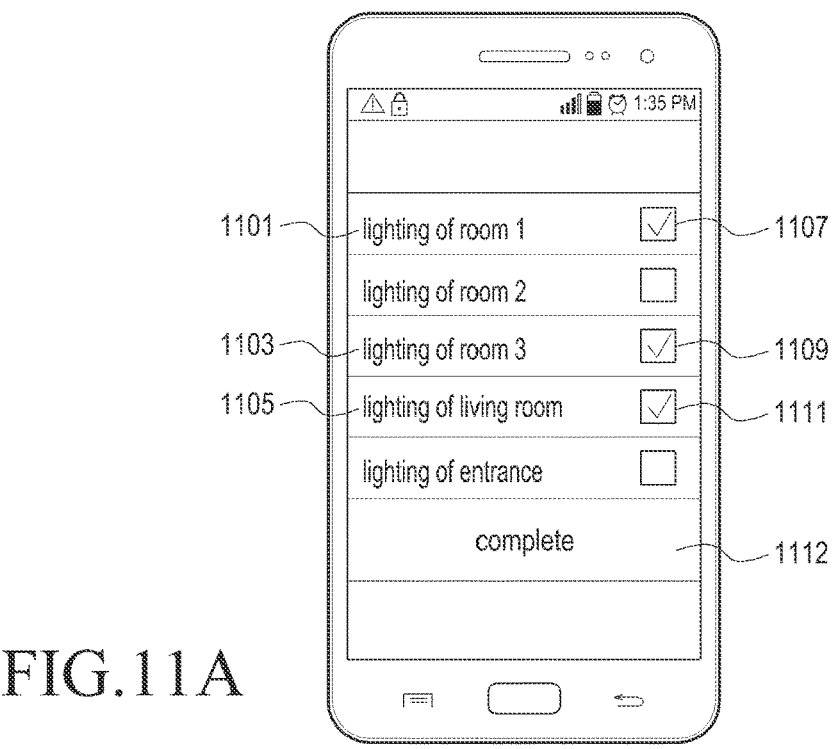
FIGS. 11A and 11B illustrate examples of user interface screens displayed on a mobile terminal during execution of remote control according to another embodiment of the present disclosure.
Figure 11B:
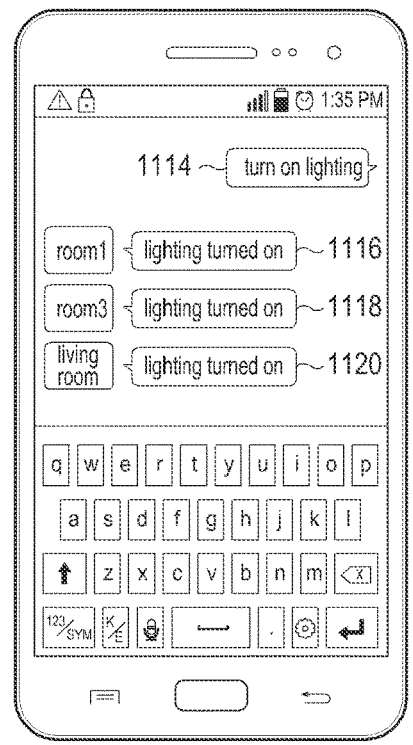

FIGS. 11A and 11B illustrate examples of user interface screens displayed on a mobile terminal during execution of remote control according to another embodiment of the present disclosure.

While FIGS. 10A to 10G show an embodiment of remotely controlling one home device in a 1:1 chat message, FIGS. 11A and 11B show another embodiment of remotely controlling grouped multiple home devices at the same time. In this embodiment, the 'group chat' menu 1011 like in FIG. 10D may be provided to simultaneously control the grouped multiple home devices. The 'group chat' menu 1011 may be useful when there is a need to control in common the home devices capable of grouping. The term 'capable of grouping' as used herein may refer to the feasibility of remotely controlling in common multiple home devices with one control command. In other words, the home devices capable of grouping may be defined as home devices of the same type. The home devices capable of grouping may include, for example, a lighting, an air conditioner or the like, which are installed in each room, the living room and the entrance.

If the user selects 'lighting' from the chat list in FIG. 10C, and then, selects the 'group chat' menu 1011 in FIG. 10D, a pre-registered lighting list may be provided as illustrated in FIG. 11A. A home device list provided through the 'group chat' menu 1011 may be provided in the combined form of the in-home location information (e.g., room 1, room 2, room 3, living room, and entrance) and the home devices' name (e.g., lighting) as illustrated in FIG. 11A.

In the lighting list, if the user desires to remotely control 'lighting of room 1' 1101, 'lighting of room 3' 1103 and 'lighting of living room' 1105 in a group chat message, the user may make a check mark on items 1107, 1109 and 1111 that the user desires to remotely control, and then, select 'complete' 1112, thereby causing the 'lighting of room 1' 1101, the 'lighting of room 3' 1103 and the 'lighting of living room' 1105 to participate in the group chat as illustrated in FIG. 11B.

As described in FIG. 10E, if the user directly inputs a predefined chat message such as 'turn on lighting' 1114 using the soft keys, the chat message may be sent to the messenger server 200, and the messenger server 200 may generate a control message mapped to the chat message, and send the control message to the home network server 120. The home network server 120 may check the identification information (e.g., lighting of room 1, lighting of room 3, and lighting of living room) of the lightings, the location information (e.g., room 1, room 3, and living room) of the lightings, and the control command for controlling the lightings in common, all of the identification information, the location information and the control command being included in the control message, and then, send the checked control command (e.g., 'turn on lighting') 1114 to each of the 'lighting of room 1' 1101, the 'lighting of room 3' 1103 and the 'lighting of living room' 1105.

Each of the 'lighting of room 1' 1101, the 'lighting of room 3' 1103 and the 'lighting of living room' 1105 may transmit the operating status information corresponding to the control command to the messenger server 200 via the home network server 120, and the messenger server 200 may generate a reply chat message (e.g., 'turn on lighting') indicating the operating status information, and send the reply chat message to the mobile terminal 300. The mobile terminal 300 may provide or display reply chat messages 1116, 1118 and 1120 received from the associated lightings in the chat window, for the user.

As described above, the present disclosure allows the user to remotely control a home device using an instant messenger application universally installed in the user's mobile terminal, without the need to install a separate application for controlling home devices. In addition, the user may easily remotely control a home device using the friendly and familiar UI environment provided by the instant messenger application.

As is apparent from the foregoing description, according to an embodiment of the present disclosure, there is no need to install a separate application for controlling home devices in the mobile terminal. In addition, the user may control the home device using the instant messenger application universally installed in the mobile terminal, so the user may easily remotely control the home device using the friendly and familiar UI environment provided by the instant messenger application.

For example, although a control command (or a control message) that is converted from a chat message by the messenger server 200 is sent to the home device via the home network server 120 in the above-described embodiments, the control command (or the control message) may be directly sent to the home device, without passing though the home network server 120. In addition, the home network server 120 may be implemented as a home gateway that is connected to some of the home devices in the home. In this case, the messenger server 200 may send the control command (or the control message) to some of the home devices via the home gateway, and may directly send the control command (or the control message) to the remaining home devices.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for remotely controlling a home device in a mobile terminal, the method comprising:
   transmitting, to a server, a request message for registering the home device using a chat window of a chat application;
   receiving, from the server, a response message indicating that the home device is registered to the server;
   receiving a chat message input to the chat window, the chat message being associated with a control of the registered home device; and
   transmitting the chat message to the server;
   wherein the transmitted chat message is converted, at the server, into a corresponding control command, which is transmitted to the home device.

2. The method of claim 1, further comprising:
   receiving a reply chat message indicating a result for the chat message from the server; and
   displaying the reply chat message through the chat window.

3. The method of claim 2, wherein the chat message includes at least one of a 1:1 chat message that is mapped to a control command for controlling one home device, and a group chat message that is mapped to a group control command for simultaneously controlling at least two grouped home devices.

4. The method of claim 1, wherein the chat message includes at least one of identification information of the home device, in-home location information of the home device, control information for controlling an operation of the home device, and user information of the mobile terminal.

5. The method of claim 1, wherein the chat message includes at least one of messages registered in advance.

6. The method of claim 1, wherein the chat message includes any one text menu selected from multiple text menus.

7. The method of claim 6, wherein the multiple text menus are provided through a pop-up window.

8. A method for remotely controlling a home device in a server communicating with a mobile terminal, the method comprising:
   receiving a request message for registering at least one home device, from a mobile terminal;
   discovering the home device based on the request message;
   receiving information of the home device;
   registering the home device in the server;
   transmitting a response message indicating that the home device is registered to the server, to the mobile terminal;

receiving, from the mobile terminal, a chat message input to a chat window in a chat application of the mobile terminal, the chat message being associated with a control of the registered home device;

converting the chat message into a corresponding control message; and transmitting the converted control message to the at least one home device.

9. The method of claim 8, wherein the control message is agreed between the server and the home device.

10. The method of claim 8, further comprising:

receiving an operation processing result for the control message from the home device;

converting the chat message into a reply chat message indicating the received operation processing result; and transmitting the reply chat message to the mobile terminal.

11. The method of claim 8, wherein the information of the home device is received from at least one of the mobile terminal and manufacturer server of the home device.

12. A mobile terminal for remotely controlling a home device, the mobile terminal comprising:

a storage unit configured to store an execution file of a chat application;

a controller configured to execute the execution file of the chat application; and a transceiver configured to transmit, to a server, a request message for registering the home device using a chat window of a chat application, to receive, from the server, a response message indicating that the home device is registered to the server, to receive a chat message input to the chat window, the chat message being associated with a control of the registered home device, and to transmit the chat message to the server, wherein the transmitted chat message is converted, at the server, into a corresponding control command, which is transmitted to the home device.

13. The mobile terminal of claim 12, wherein the transceiver receives a reply chat message indicating a result for the chat message from the server and the reply chat message is displayed through the chat window.

14. The mobile terminal of claim 13, wherein the chat message includes at least one of a 1:1 chat message that is mapped to a control command for controlling one home device, and a group chat message that is mapped to a group control command for simultaneously controlling at least two grouped home devices.

15. The mobile terminal of claim 12, wherein the chat message includes at least one of identification information of the home device, in-home location information of the home device, control information for controlling an operation of the home device, and user information of the mobile terminal.

16. The mobile terminal of claim 12, wherein the chat message includes at least one of messages registered in advance.

17. The mobile terminal of claim 12, wherein the chat message includes any one text menu selected from multiple text menus.

18. The mobile terminal of claim 17, wherein the multiple text menus are provided through a pop-up window.

19. A server for remotely controlling a home device, the server communicating with a mobile terminal, the method comprising:

a transceiver configured to receive a request message for registering at least one home device, from a mobile terminal;

a processor configured to discover the home device based on the request message, wherein the transceiver configured to receive information of the home device and to transmit a response message indicating that the home device is registered to the server, to the mobile terminal, wherein the processor configured to registering the home device in the server.

20. The server of claim 19, wherein the control message is agreed between the server and the home device.

21. The server of claim 19, further comprising:

wherein the transceiver configured to receive an operation processing result for the control message from the home device, wherein the processor configured to convert the chat message into a reply chat message indicating the received operation processing result, wherein the transceiver configured to transmit the reply chat message to the mobile terminal.

22. The server of claim 19, wherein the information of the home device includes at least one of identification information of the home device, capability information of the home device, a device code information identifying the home device, a nickname of the home device information and location information of the home device.

23. The server of claim 19, wherein the information of the home device is received from at least one of the mobile terminal and manufacturer server of the home device.

* * * * *